Nov. 9, 1926.  1,606,244
A. S. KROTZ
VEHICLE TIRE
Filed July 26, 1922
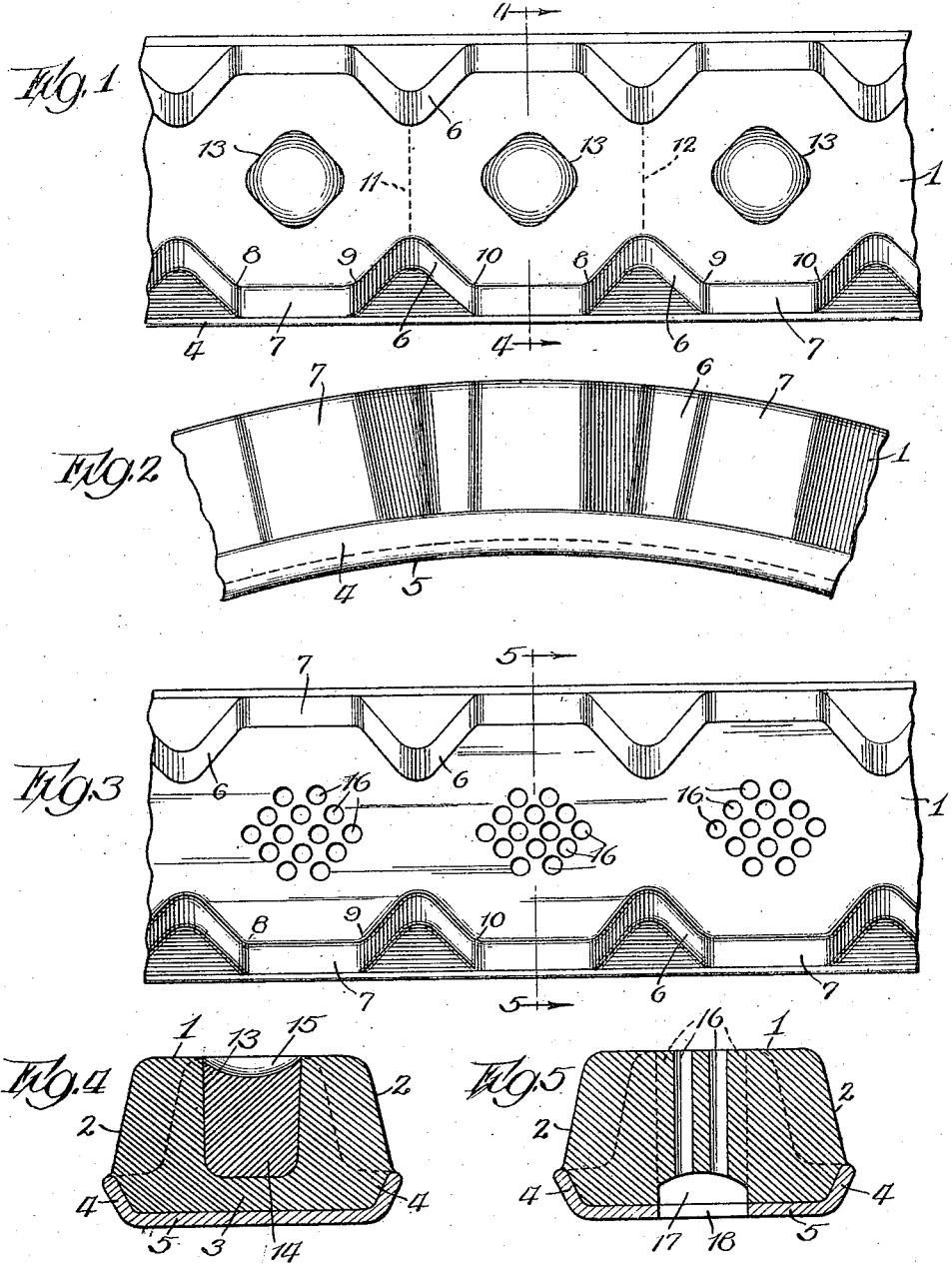
Inventor:
Alvaro S. Krotz
by Arthur F. Durand
Atty.

Patented Nov. 9, 1926.

1,606,244

UNITED STATES PATENT OFFICE.

ALVARO S. KROTZ, OF JANESVILLE, WISCONSIN.

VEHICLE TIRE.

Application filed July 26, 1922. Serial No. 577,497.

This invention relates to rubber vehicle tires of that kind in which a solid body of rubber is provided with a tread portion and with a base portion to engage the rim or channel iron of the wheel, and with openings or notches or irregular formation of some kind along the tread thereof, or along the sides of the tire, in order to prevent skidding and increase traction and for other reasons.

Generally stated, therefore, the object of the invention is to provide a novel and improved rubber vehicle tire of the foregoing general character, having novel provisions for not only increasing the traction and for preventing skidding, or for minimizing these things, but also for breaking up the circumferential flow of rubber, while the tire is in action on the pavement, thereby to ensure a smooth running tire which will tend to prevent skidding and which will have the other essential requirements of a rubber tire of this general character.

It is also an object to provide certain details and features of construction tending to increase the general efficiency and desirability of a rubber tire of this particular character.

To these and other useful ends the invention consists in matters hereinafter set forth and claimed and shown in the accompanying drawings in which—

Figure 1 is a face view of the tread of a tire embodying the principles of the invention.

Figure 2 is a side elevation of the section of rubber tire shown in Figure 1.

Figure 3 is a view similar to Figure 1, showing a different form of the invention.
Figure 4 is a cross section on line 4—4 in Figure 1.

Figure 5 is a cross section on line 5—5 in Figure 3.

As thus illustrated, the rubber tire shown in Figure 1 has, in cross section, as shown in Figure 4, a flat tread surface 1, preferably inwardly inclined flat sides 2, and a base portion 3 having preferably outwardly inclined sides 4 to engage the sides of the channel rim 5 of the wheel. The sides of the tire are preferably provided at intervals with V-shaped notches 6, these notches being of such width that the intermediate straight portions 7 of the sides are preferably the same width, so that notches of a certain width alternate with side portions of the same width, inasmuch as the distance from 8 to 9 is the same as the distance from 9 to 10 along each side of the tire. It will be seen that the notches 6 at one side are opposite the notches 6 at the other side of the tire, and it will be seen that the sides of the notches at one side are parallel with the sides of the notches at the other side. Thus, if the tire were separated into sections, by cutting it transversely from the apex of each notch at one side to the point of the notch at the other side, the sections thus produced would be octagonal in shape, or substantially so, as shown by the section indicated between the two dotted lines 11 and 12 in Figure 1 of the drawings. The tire thus formed rolls smoothly and without appreciable vibration, inasmuch as the side portions 7 are of the same width as the V-shaped notches, in the manner shown and described, and the tire is adapted to have the desired traction effect on the ground, and the tendency towards skidding is also reduced.

In Figures 1 and 4 it will also be seen that each octagonal section of the tire has a center cavity 13 which is preferably substantially square, when the tire is viewed as shown in Figure 1, except that the corners of the cavity are rounded as shown. Also, this cavity is preferably filled with soft rubber 14, or with other material which is softer than the body of the tire, in a manner to leave a shallow cavity 15 at the tread of the tire. With this construction, the tire is provided on its tread with cavities which tend to prevent skidding and which increase the traction of the tire on the ground, or on a pavement, but at the same time these cavities cannot fill up with dirt and mud. The filling 14 of each cavity is so soft that it practically offers no opposition to the flow of rubber into this soft spot, when the tread of the tire is in action on the ground, but at the same time this rubber filling 14 will expand or flow into the cavity 15 when the body of the tire flows into the soft spot and thus provides an expansible filling for the cavities, in the manner shown. The cavities 15 are shallow so that they will not become permanently plugged with dirt or mud or stones, but they are deep enough to give the effect of a tire having a tread with sufficient irregular formation to ensure traction and a tendency against skidding. The soft filler 14 will expand and fill the cavity 15 and therefore come in contact with the road surface. Therefore, as the tread surface 1 wears down the filler 14 will wear so that the cavity 15 will remain substantially the same during the life of the tire.

In Figures 3 and 5, it will be seen, the construction is substantially the same as that previously described, except that in this case the octagonal sections of the tire are provided with a group of small holes 16 which may extend through into a shallow cavity 17 formed in the base of the tire, with an opening 18 in the rim opposite this cavity, or these holes can extend to about the same depth as the soft spot 15 of Figure 4 as shown. The group of holes 16 in effect forms a soft spot for each octagonal section of the tire, which gives the same effect, to a large extent, as the soft spots shown and described in connection with Figures 1 and 4 of the drawings. In other words, the soft spots of Figure 1 are composed of fillings of softer rubber, whereas the soft spots of Figure 3 are formed from the same rubber or from the rubber of the body, but with small holes or cells located so close together that the effect is a softer area or spot of the required character into which rubber from the body of the tire can flow.

Thus the tire is preferably composed of octagonal sections which are integrally united and the sides of which are the same in width as the mouths of the V-shaped notches between them. Also, in each form of the invention, each octagonal section of the tire has a central soft spot formed in a suitable way, as explained, as a substitute for a large cavity which might fill up or become plugged with dirt or mud or stones, as is common with tires having large cavities of this kind. In other words, the soft spot assures the desired result, much as a large cavity would, but has the advantage of being able to keep itself from becoming filled or plugged with dirt or mud or stones taken up from the road, and is self-cleaning, so to speak, inasmuch as each soft spot has the ability to expel a stone or plug of dirt or mud when something of this kind is forced therein. In one sense, therefore, the effect in each case, or in both forms of the invention, or in any equivalent form thereof, is that of a comparatively large tread cavity with compressible and resilient means (more yielding than the body of the tire) therein to keep the cavity from becoming plugged or filled with things taken up from the road.

So far as these soft spots are concerned, the tire may be of any suitable form or shape, and the soft spots located and spaced accordingly. However, it will be observed that each soft spot is advantageously located at the center of one of the octagonal sections of the tire, so that the flow of the rubber in the body of the tire, when the tread is in action on the ground, finds an outlet not only practically in any direction at the sides of the tire, but also at the center of the tread.

Of course, the notches 6 and also the soft spots, regardless of whether the soft spots are formed as shown in Figure 1 or as shown in Figure 3, serve to provide an outlet for the flow of rubber, in almost any direction, and to break up or counteract the traction wave which is always a source of trouble in rubber tires. The soft tread spots are, of course, more yielding than the body of the tire, and each spot must be of substantial width, in order to be a soft spot for the purpose and of the desired character.

In Figures 3 and 5 the successive soft spots are formed by cellular rubber, and if these soft spots were omitted cavities of substantial size would be formed. Hence the fillings for these cavities are of cellular rubber, and this cellular rubber is not only united laterally with the body of the tire, but is also integral therewith. In Figures 1 and 2 the successive fillings are of a different kind of rubber, but if omitted would also produce cavities of substantial size. Thus, in each form of the invention, the tread surface is provided with successive soft spots formed by fillings which are softer than the body of the tire and these fillings may be formed in either way, or in any suitable manner, as shown and described. The lateral notches subtract from the tread surface of the tire, so that the tire has successive tread surface portions of maximum width alternating with intermediate tread surface portions of less width, for each notch opens on the tread surface of the tire as well as upon the lateral surface thereof. Furthermore, it will be seen that the soft spots, in either form of the invention, are entirely within the area of the tread surface of the tire, as none of the soft spots reach to the sides of the tire. Also, the tire is essentially a continuous tread tire, with successive soft spots and successive lateral notches therein, for at no point is the tire divided transversely thereof entirely across the tread. The notches partially divide the tire transversely, but not enough to destroy the practically continuous tread surface formed between the sides of the tire. In this sense, therefore, the invention relates to a continuous tread surface rubber vehicle tire molded in annular form upon the annular channel rim thereof. In either form of the invention, the filling or soft spot is entirely surrounded and united laterally with the body of the tire, so that each soft spot is only exposed on the smooth and continuous tread of the tire. Of course, and regardless of whether the soft spot is of the form shown in Figure 1, or the form shown in Figure 3, it follows that it has a cavity at its outer end, or outer tread surface of the tire. As shown in Figure 4 this cavity is a single cavity of substantially the same area as the soft spot itself; but as shown in Figure 5 the cavity at the tread is a multiple cavity, so to speak, formed by the outer ends of the holes or cells 16 formed in the rubber. However, as stated, the soft spot, in either form of the invention, has a cavity at its outer end of the tread surface of the tire.

The soft spots or fillings, therefore, can be of either form, as shown in Figs. 4 and 5. In either case these soft spots cooperate with the notches 6 to break up the traction wave, which latter is destructive if not counteracted in some way, as is well known. Also, the soft spots tend to counteract the tendency of the notches 6 to interfere with the smooth rolling action of the tire. In other words, the notches alone would tend to give the tire a bumpy, uneven or vibratory rolling action, and the soft spots are provided in alternation with the notches to ensure a more smooth and less bumpy rolling action than would result from the use of the notches alone. These notches increase the traction of the tire, and in conjunction with the soft spots break up the traction wave. These soft spots, also, make the octagonal sections of the tire more yielding, so that they more nearly approximate the strength and firmness of the narrow portions which connect the sections together, so that the tire has a more uniform yielding action along its tread, and without the notches, therefore, the soft spots would not be necessary.

Thus it will be seen that the air spaces 15 and 16 provide the soft spots with air space therein, whereby rubber from the body of the tire may flow into the soft spots, in the manner explained.

What I claim as my invention is—

1. A continuous tread surface rubber vehicle tire provided with successive sections of material forming soft tread spots which are more yielding than the body of the tire and which are disposed at intervals circumferentially of the tread and between the opposite sides thereof, the tire having lateral means alternating and cooperating with said spots to break up the traction wave, each section of material being united laterally with the body of the tire.

2. A continuous tread surface rubber tire having notches at the sides thereof, whereby the tire is composed of integrally united tire sections of maximum width and uniform shape and size, with central tread surface portions of less width uniting the sections, and successive sections of material forming a soft tread spot at the center of each wider tire section, cooperating with said notches to break up the traction wave.

3. A rubber tire having a base and flat tread with exposed sides, notches extending across the sides thereof, whereby the tire is composed of integrally united tire sections of uniform shape and size, with relatively narrow central tread portions alternating therewith, and a comparatively large soft spot at the center of each section, midway between the sides of the tire, said soft spots extending substantially to the base of said tire and whereby circumferential traction waves will intersect a notch or a soft spot, and whereby rubber from the body of the tire can flow into said soft spots or notches.

4. A rubber tire with a base and flat tread surface having exposed side walls, comparatively large and deep sections forming soft spots in the tread surface, disposed at intervals circumferentially thereof and surrounded by and integrally united with the body of the rubber, with air space in said soft spots whereby rubber from the body of the tire may flow into said soft spots.

5. A rubber tire having successive soft spots formed by relatively soft sections of rubber, between the sides of the tire, so that when in action the rubber of the tire can flow into said spots.

6. A structure as specified in claim 5, said spots being each formed with air space into which the rubber may flow when the tire is in action.

7. A structure as specified in claim 5, said spots disposed midway between the sides of the tire, in line and alternating with relatively narrow central tread portions.

8. A structure as specified in claim 5, each spot having an air space at one end thereof.

ALVARO S. KROTZ.